United States Patent [19]

Berneth

[11] Patent Number: 5,138,070
[45] Date of Patent: Aug. 11, 1992

[54] PENTAMETHINE DYESTUFFS AND DERIVATIVES

[75] Inventor: Horst Berneth, Leverkusen, Fed. Rep. of Germany

[73] Assignee: Bayer Aktiengesellschaft, Leverkusen, Fed. Rep. of Germany

[21] Appl. No.: 570,475

[22] Filed: Aug. 21, 1990

[30] Foreign Application Priority Data

Sep. 13, 1989 [DE] Fed. Rep. of Germany ....... 3930520

[51] Int. Cl.$^5$ ................. C07D 401/06; C07D 403/06; C07D 413/06
[52] U.S. Cl. .................... 548/455; 544/143; 544/333; 548/374; 548/255; 546/273
[58] Field of Search ...................... 548/455, 375, 255; 546/273

[56] References Cited

U.S. PATENT DOCUMENTS 4,405,788  9/1983  Locatell ............................. 548/455

FOREIGN PATENT DOCUMENTS 3704263  8/1988  Fed. Rep. of Germany .
3721850  1/1989  Fed. Rep. of Germany ...... 548/455
3738240  5/1989  Fed. Rep. of Germany .
3833997  4/1990  Fed. Rep. of Germany ...... 548/455

Primary Examiner—David B. Springer
Attorney, Agent, or Firm—Sprung Horn Kramer & Woods

[57] ABSTRACT

Dyestuffs of the formula

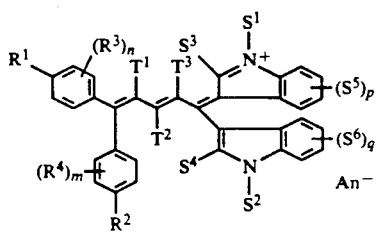

and their base derivatives, in which the radicals have the meaning given in the description, are outstandingly suitable for laser transfer printing or as optical recording materials.

2 Claims, No Drawings

PENTAMETHINE DYESTUFFS AND DERIVATIVES

This invention relates to pentamethine dyestuffs of the formula

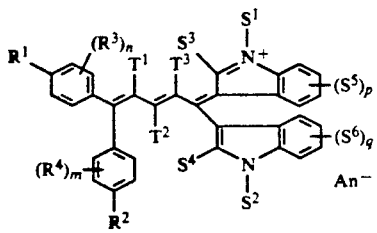

and to derivatives of pentamethine dyestuffs of the isomeric formulae

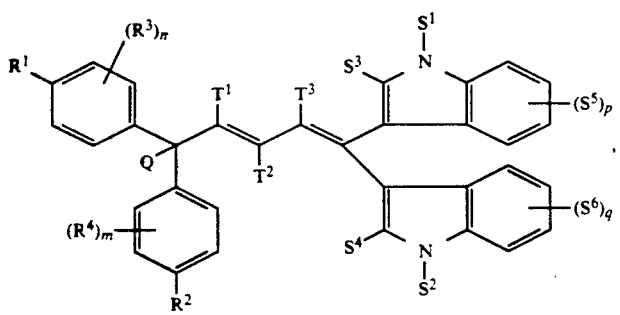

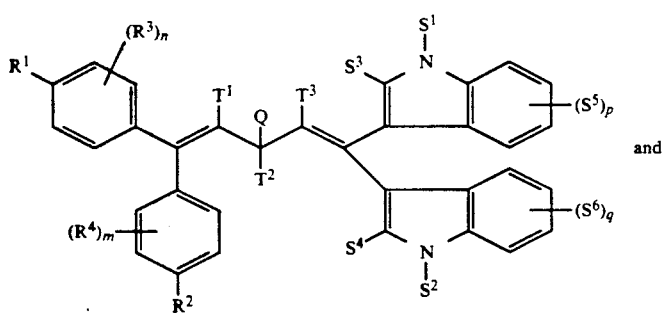

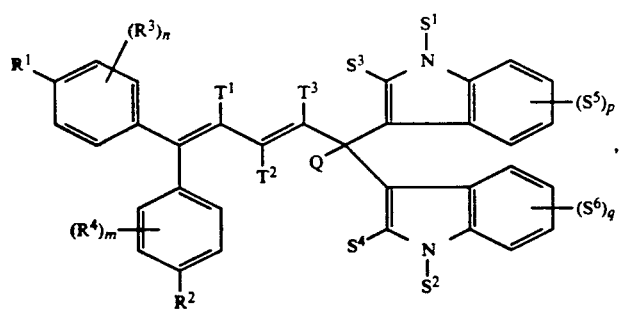

in which
- $R^1$ and $R^2$ independently of one another denote hydrogen, halogen, alkyl, cycloalkyl, aralkyl, alkoxy, cycloalkoxy, phenoxy, alkylthio or $NP^1P^2$,
- $R^3$ and $R^4$ independently of one another denote hydrogen, halogen, alkyl, alkoxy or phenyl,
- $P^1$ and $P^2$ independently of one another denote hydrogen, alkyl, cycloalkyl, alkenyl, aralkyl, aryl or a heterocyclic radical which is optionally bonded via alkyl, or
- $P^1$ and $P^2$, together with N, denote a 5-, 6- or 7-membered saturated or partially unsaturated ring, which may contain 0–2 other heteroatoms such as N, O or S and may be substituted by alkyl or phenyl, or
- $P^1$ and/or $P^2$ with $R^3$ and/or $R^4$ form the remaining atoms of a 5- or 6-membered ring, which may still contain an O or N and may be substituted by alkyl or phenyl,
- Q denotes OV, $NV^1V^2$, SW, $SO_2X$ or $CLY^1Y^2$,
- $S^1$ and $S^2$ independently of one another denote hydrogen, alkyl, alkenyl, cycloalkyl, aralkyl or a heterocyclic radical which is bonded via alkyl,
- $S^3$ and $S^4$ independently of one another denote hydrogen, alkyl, alkenyl, cycloalkyl, aralkyl, aryl or a heterocyclic radical which is optionally bonded via alkyl,
- $T^1$ to $T^3$ denote hydrogen, alkyl, alkenyl, cycloalkyl, aralkyl, halogen, alkoxy, dialkylamino, cyano, hydroxycarbonyl, alkoxycarbonyl, aryl, a heterocyclic radical optionally bonded via alkyl or, in each case, two of the radicals $T^1$ to $T^3$ denote the missing members of a 5- to 7-membered ring, which may be aromatic or partially hydrogenated and may contain up to two heteroatoms from the series comprising O, N or S,
- $S^5$ and $S^6$ independently of one another denote hydrogen, alkyl, alkenyl, cycloalkyl, aralkyl, aryl, hydroxyl, alkoxy, halogen, dialkylamino, nitro, cyano, alkylthio, alkoxycarbonyl, dialkylaminocarbonyl, alkoxycarbonyloxy or alkylsulphonyl or, together with $S^1$ or $S^2$, denote a $C_2$- or $C_3$-bridge, V, $V^2$ and $V^2$ independently of one another denote hydrogen, alkyl, alkenyl, cycloalkyl, or aryl or heterocyclic radicals which are bonded via alkyl, $-CO-Z^1$,

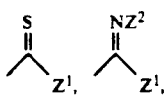

CN or $V^1$ and $V^2$, together with the nitrogen atom, denote an optionally completely or partially hydrogenated ring containing 0-3 heteroatoms from the series comprising O, N, S and $SO_2$, heteroatoms from the series comprising O, N, S and $SO_2$, W denotes hydrogen, alkyl, alkenyl, cycloalkyl, or aryl or heterocyclic radicals which are optionally bonded via alkyl,

or CN,

X denotes alkyl, alkenyl, cycloalkyl, or aryl or heterocyclic radicals which are optionally bonded via alkyl, L denotes hydrogen, alkyl, alkenyl, cycloalkyl, halogen, or aryl or heterocyclic radicals which are bonded via alkyl, or has the meaning of $Y^1$ or $Y^2$, $Y^1$ and $Y^2$ denote $-CO-Z^1$,

$-CN$, $-SO_2-Z^1$, $NO_2$, aryl or a heterocyclic radical, $Z^1$ to $Z^3$ denote hydrogen, alkyl, alkenyl, cycloalkyl, alkoxy, alkylthio, cycloalkoxy, amino, mono- or bisalkylamino, arylamino, or aryl or heterocyclic radicals which are optionally bonded via alkyl or alkoxy, or $Z^1$ and $Z^2$ with $V^1$ or $V^2$ or with $Y^1$ or $Y^2$ or with another radical $Z^1$ or $Z^{2'}$ denote the missing members of a ring which contains 0-2 heteroatoms from the series comprising O, N, S or $SO_2$ and which is optionally completely or partially hydrogenated and optionally benzo-fused, where $Z^{1'}$ and $Z^{2'}$ have the meaning of $Z^1$ and $Z^2$, n, m, p and q denote 1 or 2 and $An^-$ represents an anion and all cyclic and non-cyclic radicals can carry non-ionic substituents customary in dyestuff chemistry, to their preparation, to the use of the dyestuffs in optical recording materials and to optical recording materials which contain these dyestuffs, and to the use of the derivatives in pressure- and thermosensitive recording materials which can be read in the wavelength range 600 to 900 nm, and to recording materials which contain these derivatives.

Alkyl radicals, including those in, for example, alkoxy, alkylamino or aralkyl, can have up to 18 C atoms and be substituted, for example, by halogen, $C_1-C_4$-alkoxy, nitro, cyano, $C_1-C_4$-alkoxycarbonyl or $C_1-C_4$-alkylsulphonyl.

Alkenyl radicals can have up to 18 C atoms and be substituted, for example, by halogen, $C_1-C_4$-alkoxy, cyano or $C_1-C_4$-alkoxycarbonyl.

Cycloalkyl radicals can have 3-8 C atoms and be substituted, for example, by $C_1-C_4$-alkyl, $C_1-C_4$-alkoxy, halogen, cyano, $C_1-C_4$-alkoxycarbonyl or aryl.

Aryl radicals, including those in aralkyl groups, are phenyl, naphthyl or anthracenyl, which can be substituted, for example, by $C_1-C_4$-alkyl, $C_1-C_4$-alkoxy, halogen, cyano, $C_1-C_4$-alkoxycarbonyl, nitro, aryl or heterocyclic radicals, up to 5 substituents, which do not have to be identical, being possible.

Heterocyclic radicals, including those which are bonded via alkyl, are five- to seven-membered aromatic or quasi-aromatic heterocycles or their partially or completely hydrogenated derivatives which contain O, N, S or $SO_2$ as heteroatoms, a maximum of 4 such heteroatoms, which can also be mixed together, occurring in a ring, and it being possible for these heterocycles to be fused to benzene, naphthalene or pyridine and/or substituted by $C_1-C_4$-alkyl, $C_1-C_4$-alkoxy, halogen, cyano, $C_1-C_4$-alkoxycarbonyl, nitro or aryl.

Halogen denotes fluorine, chlorine or bromine, in particular chlorine.

Anions $An^-$ are, for example, halide ions, $BF_4^-$, $ClO_4^-$, $SiF_5^{2-}$, $PF_6^-$, $B(C_6H_5)_4^-$, $H_2PO_4^-$ or the anions of $C_1$- to $C_{18}$-carboxylic acids, $C_2-C_{18}$-dicarboxylic acids, $C_1-C_{18}$-alkanesulphonic acids, benzene- or naphthalene-mono- or -dicarboxylic or -sulphonic acids which are optionally substituted by halogen, $C_1-C_4$-alkyl, $C_1-C_4$-alkoxy, hydroxyl, cyano, $C_1-C_4$-alkoxycarbonyl, nitro or $C_1-C_4$-alkylsulphonyl.

Preferred pentamethine dyestuffs are those of the formula

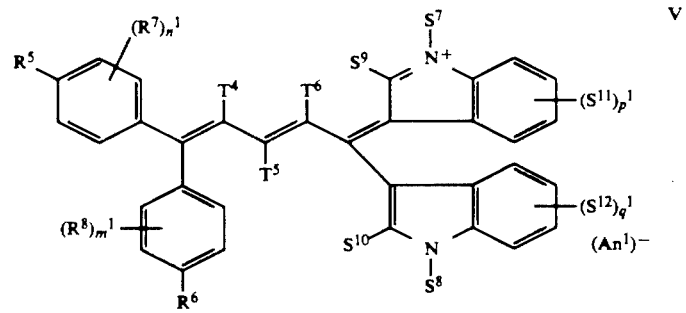

and derivatives of pentamethine dyestuffs of the isomeric formulae

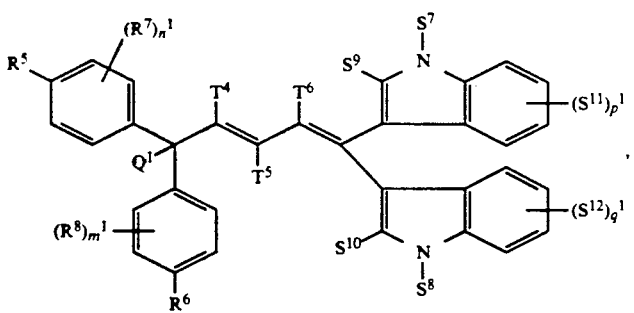

VI

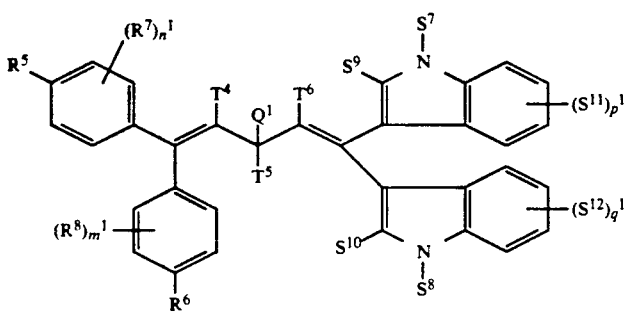

VII and

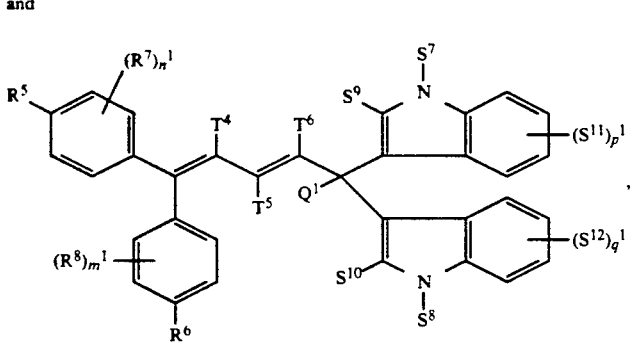

VIII in which
- $R^5$ denotes $C_1$-$C_{18}$-alkoxy or $C_1$-$C_{18}$-alkylthio radicals, which can be substituted by chlorine or $C_1$-$C_4$-alkoxy, or cyclopentoxy, cyclohexoxy, benzyloxy or phenyloxy radicals, which can be substituted by $C_1$-$C_4$-alkyl, $C_1$-$C_4$-alkoxy and/or chlorine, or $NP^3P^4$,
- $R^6$ denotes hydrogen, chlorine, $C_1$-$C_{18}$-alkyl, cyclopentylo, cyclohexylo, benzyl or the meaning of $R^5$
- $R^7$ and $R^8$ independently of one another denote hydrogen, chlorine, $C_1$-$C_4$-alkyl, $C_1$-$C_4$-alkoxy or phenyl,
- $P^3$ and $P^4$ independently of one another denote hydrogen, $C_1$-$C_{18}$-alkyl, which can also be substituted by chlorine, hydroxyl, $C_1$-$C_4$-alkoxy, cyano, $C_1$-$C_4$-alkoxycarbonyl and/or $C_1$-$C_4$-alkanoyloxy, or cyclopentyl, cyclohexyl, $C_3$-$C_{10}$-alkenyl, or benzyl, phenethyl, phenyl, pyridylmethyl or pyridylethyl radicals which can be substituted by chlorine, $C_1$-$C_4$-alkyl, $C_1$-$C_4$-alkoxy, nitro, cyano and/or $C_1$-$C_4$-alkoxycarbonyl, or
- $P^3$ and $P^4$, together with N, denote a pyrrolidine, piperidine, piperazine, morpholine or pyrazoline radical which is optionally substituted by chlorine, $C_1$-$C_4$-alkyl and/or phenyl $P^3$—$R^7$, $P^4$—$R^7$, $P^3$—$R^8$ or $P^4$—$R^8$ denotes an atom group of the formulae —$CH_2$—$CH_2$—, —$CH_2$—$CH_2$—$CH_2$—,

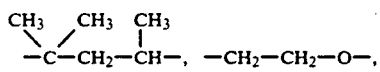

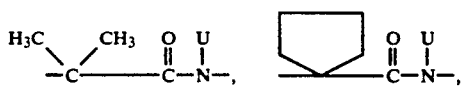

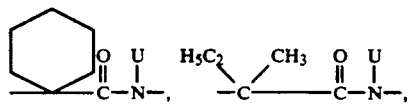

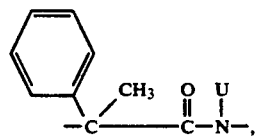

U denotes hydrogen, $C_1$-$C_4$-alkyl or benzyl,
$Q^1$ denotes hydroxyl, $C_1$-$C_{18}$-alkoxy which can be substituted by chlorine, $C_1$-$C_4$-alkoxy, cyano or $C_1$-$C_4$-alkoxycarbonyl, or allyloxy, cyclopentoxy, cyclohexoxy, or benzyloxy, phenethoxy, naphthylmethoxy, picolyloxy, phenoxy or naphthoxy radicals which are optionally substituted by $C_1$-$C_4$-alkyl, chlorine and/or $C_1$-$C_4$-alkoxy, or

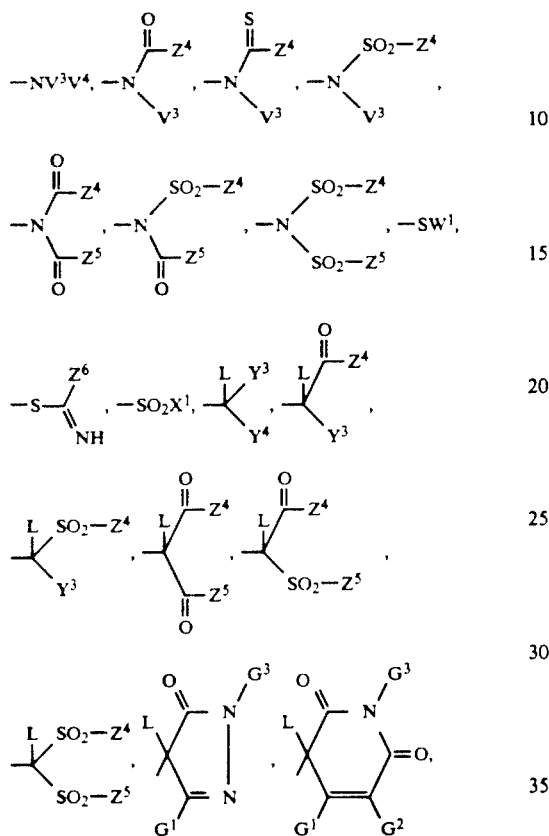

$S^7$ and $S^8$ independently of one another denote hydrogen, $C_1$-$C_{18}$-alkyl which can be substituted by chlorine, $C_1$-$C_4$-alkoxy, cyano or $C_1$-$C_4$-alkoxycarbonyl, or allyl, cyclopentyl, cyclohexyl, or benzyl, phenethyl, naphthylmethyl or picolyl radicals which are optionally substituted by $C_1$-$C_4$-alkyl, chlorine and/or $C_1$-$C_4$-alkoxy, $S^9$ and $S^{10}$ independently of one another denote hydrogen, $C_1$-$C_{18}$-alkyl which can be substituted by chlorine, $C_1$-$C_4$-alkoxy, cyano or $C_1$-$C_4$-alkoxycarbonyl, or allyl, cyclopentyl, cyclohexyl, or benzyl, phenethyl, naphthylmethyl, picolyl, quinolylmethyl, phenyl, naphthyl, pyridyl, pyrimidyl, pyrazinyl, imidazolyl, oxazolyl, thiazolyl, triazolyl, benzimidazolyl, benzoxazolyl, benzothiazolyl or quinolyl radicals which are optionally substituted by $C_1$-$c_4$-alkyl, chlorine, bromine, $C_1$-$C_4$-alkoxy, cyano, nitro and/or $C_1$-$C_4$-alkoxycarbonyl, $T^4$-$T^6$ denote hydrogen, $C_1$-$C_8$-alkyl which can be substituted by chlorine, $C_1$-$C_4$-alkoxy, cyano or $C_1$-$C_4$-alkoxycarbonyl, or vinyl, allyl, cyclopentyl, cyclohexyl, fluorine, chlorine bromine, $C_1$-$C_8$-alkoxy which can further be substituted by $C_1$-$C_4$-alkoxy, or $C_1$-$C_4$-dialkylamino, piperidino, pyrrolidino, nitro, cyano, $C_1$-$C_4$-alkoxycarbonyl, or benzyl, phenethyl, naphthylmethyl, picolyl, phenyl, naphthyl, pyridyl, quinolyl, pyrimidyl, pyrazinyl, indolyl, indolenyl, indolizinyl, imidazolyl, oxazolyl, thiazolyl, triazolyl, benzimidazolyl, benzoxazolyl or benzothiazolyl radicals which are optionally substituted by $C_1$-$C_4$-alkyl, chlorine, $C_1$-$C_4$-alkoxy, $C_1$-$C_4$-alkylsulphonyl, cyano and/or $C_1$-$C_4$-alkoxycarbonyl, or in each case two of the radicals $T^4$ to $T^6$ denote a bridge of the formulae —$CH_2$—$CH_2$—, —$CH_2CH_2CH_2$—, —$CH_2CH_2CH_2CH_2$—, —$CH_2SCH_2$—, —$CH_2$—$\underset{CH_3}{\overset{CH_3}{C}}$—$CH_2$—, —O—$\underset{CH_3}{\overset{CH_3}{C}}$—O—,

—CH═CH—$CH_2$—, —CH═CH—CH═CH—, $S^{11}$ and $S^{12}$ denote hydrogen, $C_1$-$C_8$-alkyl, allyl, cyclohexyl, benzyl, phenyl, hydroxyl, $C_1$-$C_4$-alkoxy, chlorine, bromine, $C_1$-$C_4$-dialkylamino, nitro, cyano, $C_1$-$C_4$-alkylthio, $C_1$-$C_4$-alkoxycarbonyl, $C_1$-$c_4$-dialkylaminocarbonyl, $C_1$-$C_4$-alkoxycarbonyloxy or $C_1$-$C_4$-alkylsulphonyl or, together with $S^7$ or $S^8$, denote a —$CH_2CH_2$—or —$CH_2CH_2CH_2$—bridge which can be substituted by a maximum of three methyl groups, $V^3$, $V^4$ and $W^1$ independently of one another denote hydrogen, $C_1$-$C_{18}$-alkyl which can be substituted by chlorine, $C_1$-$C_4$-alkoxy, cyano or $C_1$-$C_4$-alkoxycarbonyl, or allyl, cyclopentyl, cyclohexyl, cyano, or benzyl, phenethyl, naphthylmethyl, picolyl, quinolylmethyl, phenyl, naphthyl, pyridyl, pyrimidyl, pyrazinyl, imidazolyl, oxazolyl, thiazolyl, triazolyl, benzimidazolyl, benzoxazolyl, benzothiazolyl, quinolyl, 1,1-Dioxo-tetrahydrothien-3-yl-, piperidin-4-yl, or piperazin-1-yl-ethyl radicals which are optionally substituted by $C_1$-$C_4$-alkyl, chlorine, bromine, $C_1$-$C_4$-alkoxy, cyano, nitro or $C_1$-$C_4$-alkoxycarbonyl, or $V^3$ and $V^4$, together with the nitrogen, denote pyrrolidine, piperidine, piperazine, morpholine, pyrazoline, pyrazole, imidazole, triazole or tetrazole radicals which are optionally substituted by $C_1$-$C_4$-alkyl, chlorine, $C_1$-$C_4$-alkoxy or phenyl, $X^1$ denotes $C_1$-$C_{18}$-alkyl which can be substituted by chlorine, $C_1$-$C_4$-alkoxy, cyano or $C_1$-$C_4$-alkoxycarbonyl, or allyl, cyclopentyl, cyclohexyl, or benzyl, phenethyl, naphthylmethyl, picolyl, quinolylmethyl, phenyl, naphthyl, pyridyl, pyrimidyl, pyrazinyl, imidazolyl, oxazolyl, thiazolyl, triazolyl, benzimidazolyl-, benzoxazolyl, benzothiazolyl or quinolyl radicals which are optionally substituted by $C_1$-$C_4$-alkyl, chlorine, bromine, $C_1$-$C_4$-alkoxy, cyano, nitro or $C_1$-$C_4$-alkoxycarbonyl, L denotes hydrogen, $C_1$-$C_8$-alkyl which can be substituted by chlorine, $C_1$-$C_4$-alkoxy, cyano or $C_1$-$C_4$-alkoxycarbonyl, or allyl, cyclopentyl, cyclohexyl, chlorine, cyano, $C_1-C_8$-alkoxycarbonyl, or benzyl, phenethyl, picolyl, phenyl, naphthyl or pyridyl radicals which are optionally substituted by $C_1-C_4$-alkyl, chlorine, $C_1-C_4$-alkoxy, cyano, nitro or $C_1-C_4$-alkoxycarbonyl, $Y^3$ and $Y^4$ denote cyano, nitro or phenyl, naphthyl, pyridyl, pyrimidyl, pyrazinyl, imidazolyl, oxazolyl, thiazolyl, triazolyl, benzimidazolyl, benzoxazolyl, benzothiazolyl or quinolyl radicals which are optionally substituted by $C_1-C_4$-alkyl, chlorine, bromine, $C_1 \propto C_4$-alkoxy, cyano, nitro, $C_1-C_4$-alkylsulphonyl or $C_1-C_4$-alkoxycarbonyl, $Z^4$, $Z^5$ and $Z^6$ independently of one another denote hydrogen, $C_1-C_{18}$-alkyl which can be substituted by chlorine, $C_1-C_4$-alkoxy, cyano or $C_1-C_4$-alkoxycarbonyl, or allyl, cyclopentyl, cyclohexyl, $C_1-C_{18}$-alkoxy, $C_1-C_{18}$-alkylthio, cyclopentoxy, cyclohexoxy, amino, mono- or bis-$C_1-C_{12}$-alkylamino, or anilino, N-$C_1-C_4$-alkylanilino, diphenylamino, benzyl, benzyloxy, benzylamino, N-$C_1-C_4$-alkylbenzylamino, dibenzylamino, phenethyl, phenethoxy, phenethamino, pyridylethoxy, pyridylamino, picolyl, phenyl, naphthyl, pyridyl, pyrimidyl, pyrazinyl, imidazolyl, oxazolyl, thiazolyl, triazolyl, benzimidazolyl, benzoxazolyl, benzothiazolyl, quinolyl or piperazin-1-yl-ethyl radicals which are optionally substituted by $C_1-C_4$-alkyl, chlorine, bromine, $C_1-C_4$-alkoxy, cyano, nitro or $C_1-C_4$-alkoxycarbonyl, or $Z^4$ with $Z^5$ or $V^3$ or $Y^3$ denotes a bridge of the formulae —CH$_2$CH$_2$—, —CH=CH—, —CH$_2$CH$_2$CH$_2$—, —CH$_2$CH$_2$CH$_2$CH$_2$—,

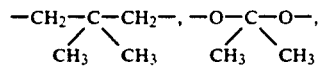

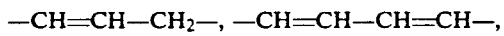

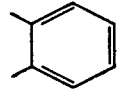

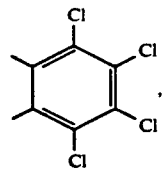

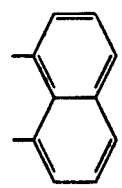

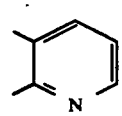

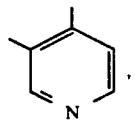

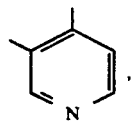

$G^1$ and $G^2$ independently of one another denote hydrogen, $C_1-C_8$-alkyl which can be substituted by chlorine, $C_1-C_4$-alkoxy, cyano or $C_1-C_4$-alkoxycarbonyl, or allyl, cyclopentyl, cyclohexyl, hydroxyl, chlorine, $C_1-C_8$-alkoxy, cyano, $C_1-C_8$-alkoxycarbonyl, nitro, $C_1-C_8$-alkylsulphonyl, or benzyl, phenethyl, picolyl, phenyl, naphthyl, pyridyl, imidazolyl, oxazolyl, thiazolyl, triazolyl, benzimidazolyl, benzothiazolyl or benzoxazolyl radicals which are optionally substituted by $C_1-C_4$-alkyl, chlorine, $C_1-C_4$-alkoxy, cyano, nitro or $C_1-C_4$-alkoxycarbonyl, $G^3$ denotes hydrogen, $C_1-C_8$-alkyl which can be substituted by chlorine, $C_1-C_4$-alkoxy, cyano or $C_1-C_4$-alkoxycarbonyl, or allyl, cyclopentyl, cyclohexyl, or benzyl, phenethyl, picolyl, phenyl, naphthyl or pyridyl radicals which are optionally substituted by $C_1-C_4$-alkyl, chlorine, $C_1-C_4$-alkoxy, cyano, nitro or $C_1-C_4$-alkoxycarbonyl, $n^1$, $m^1$, $p^1$ and $q^1$ independently of one another denote 1 or 2 and $(An^1)^-$ denotes chloride, bromide, $BF_4^-$, $ClO_4^-$, $SiF_6^{2-}$, $PF_6^-$, $B(C_6H_5)_4^-$, $H_2PO_4^-$ or the anions of $C_1$- to $C_{18}$-carboxylic acids, $C_2-C_{18}$-dicarboxylic acids, $C_1-C_{18}$-alkanesulphonic acids, benzene- or naphthalene-mono- or -dicarboxylic or -sulphonic acids which are optionally substituted by halogen, $C_1-C_4$-alkyl, $C_1-C_4$-alkoxy, hydroxyl, cyano, $C_1-C_4$-alkoxycarbonyl, nitro or $C_1-C_4$-alkylsulphonyl.

Particularly preferred pentamethine dyestuffs and derivatives of pentamethine dyestuffs of the formulae V to VIII are those in which $R^5$ denotes $C_1-C_4$-alkoxy which can be substituted by chlorine or methoxy, or cyclohexoxy, benzyloxy or phenoxy radicals which can be substituted by methyl, methoxy and/or chlorine, or $NP^3P^4$, $R^6$ denotes hydrogen, chlorine, $C_1-C_4$-alkyl or the meaning of $R^5$, $R^7$ and $R^8$ independently of one another denote hydrogen, chlorine, methyl, methoxy or phenyl, $P^3$ and $P^4$ independently of one another denote hydrogen, $C_1-C_4$-alkyl which can be substituted by chlorine, hydroxyl, methoxy, ethoxy, cyano, methoxycarbonyl and/or acetoxy, or cyclohexyl, allyl, or benzyl, phenethyl or phenyl radicals which can be substituted by chlorine, methyl, methoxy, ethoxy, nitro, cyano and/or methoxycarbonyl, or $NP^3P^4$ denotes pyrrolidino, piperidino, piperazino, N-methyl- or -ethylpiperazino, morpholino, pyrazolino,3,5,5-trimethylpyrazolino,5-methyl-1,3,5-diphenylpyrazolino or $P^3-R^7$, $P^4-R^7$, $P^3-R^8$ or $P^4-R^8$ denotes an atom group of the formulae $-CH_2-CH_2$, $-CH_2-CH_2-CH_2-$,

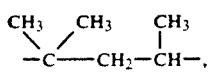

$-CH_2-CH_2-O-$

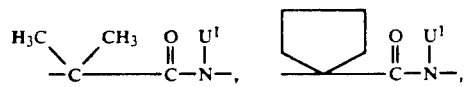

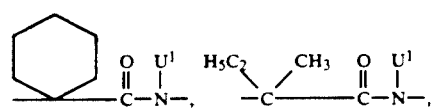

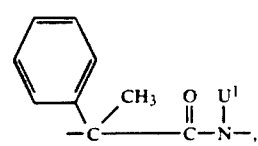

$U^1$ denotes hydrogen or methyl, $Q^1$ denotes hydroxyl, $C_1-C_8$-alkoxy which can be substituted by chlorine, methoxy, ethoxy or cyano, or allyloxy, cyclopentoxy, cyclohexoxy, or benzyloxy, 2-phenylethoxy or picolyloxy radicals which are optionally substituted by methyl, chlorine or methoxy, or $C_1-C_8$-mono- or dialkylamino, or pyrrolidino, piperidino, morpholino, piperazino,-hydroxyethylpiperazino, pyrazolo, imidazolo, triazolo or tetrazolo radicals which are optionally substituted by methyl, chlorine or methoxy, or anilino, N-$C_1-C_4$-alkylanilino, diphenylamino, benzylamino, N-$C_1-C_4$-alkyl-N-benzylamino, pyridylamino, benzoylamino, N-$C_1-C_4$-alkylbenzoylamino, N-phenylbenzoylamino, benzenesulphonylamino, N-$C_1-C_4$-alkylbenzenesulphonylamino, phthalimido, naphthalimido, homophthalimido, 2-sulphobenzoic imido, succinimido or maleimido radicals which are optionally substituted by methyl, ethyl, chlorine, cyano or nitro, or aminocarbonylamino, $C_1-C_8$-alkoxycarbonylamino, $C_1-C_6$-alkylthio, phenylthio, which is optionally substituted by methyl, chlorine or methoxy, or

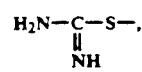

$C_1-C_8$alkylsulphonyl, or phenylsulphonyl, benzylsulphonyl or naphthylsulphonyl optionally substituted by methyl, ethyl, chlorine, bromine, cyano or methoxycarbonyl, or benzyl, naphthylmethyl, picolyl, quinolylmethyl, imidazolylmethyl, benzimidazolylmethyl, oxazolylmethyl, benzoxazolylmethyl, thiazolylmethyl, benzothiazolylmethyl, triazolylmethyl or tetrazolylmethyl radicals substituted in the α-position by cyano, $C_1-C_4$-alkoxycarbonyl, $C_1-C_4$-alkylsulphonyl, $C_1-C_4$-alkanoyl or benzoyl and optionally further substituted by methyl, ethyl, chlorine, bromine, cyano, nitro or methoxycarbonyl, or dicyanomethyl, cyano-$C_1-C_4$-alkoxycarbonylmethyl, bis-$C_1-C_4$-alkoxycarbonylmethyl, cyano-$C_1-C_4$-alkanoylmethyl, bis-$C_1-C_4$-alkanoylmethyl, or cyano-benzoylmethyl, $C_1-C_4$-alkanoyl-benzoylmethyl, $C_1-C_4$-alkoxycarbonylbenzoylmethyl, dibenzoylmethyl, cyanophenylsulphonylmethyl, $C_1-C_4$-alkanoyl-phenylsulphonylmethyl, $C_1-C_4$-alkoxycarbonylphenylsulphonylmethyl or bisphenylsulphonylmethyl radicals which are optionally substituted by methyl, ethyl, chlorine, cyano, nitro or methoxycarbonyl, or the radicals of 1,3-cyclopentanedione, 1,3-cyclohexanedione, 1,3-indanedione, Meldrum's acid, pyrazolone, 2-hydroxy-6-pyridone or barbituric acid which are optionally substituted by methyl, ethyl, chlorine, methoxy, ethoxy, phenyl, cyano, methoxy- or carbonyl, or allyl, cyclopentyl, cyclohexyl, or benzyl, phenethyl or picolyl radicals which are optionally substituted by methyl, chlorine or methoxy, $S^9$ and $S^{10}$ independently of one another denote hydrogen, $C_1-C_8$-alkyl which can be substituted by chlorine, methoxy, ethoxy, cyano or methoxycarbonyl, or allyl, cyclopentyl, cyclohexyl, or benzyl, phenethyl, picolyl, phenyl, naphthyl, pyridyl, pyrimidyl, benzimidazolyl, benzoxazolyl, benzothiazolyl or quinolyl radicals which are optionally substituted by methyl, chlorine, methoxy, cyano, nitro and/or methoxycarbonyl, $T^4$ and $T^5$ denote hydrogen, $C_1-C_8$-alkyl which can be substituted by chlorine, methoxy, cyano or methoxycarbonyl, or vinyl, allyl, cyclopentyl, cyclohexyl, chlorine, $C_1-C_8$-alkoxy, cyano, methoxycarbonyl, nitro, benzyl, or phenyl or pyridyl radicals which are optionally substituted by methyl, chlorine, cyano or methoxy, $t^5$ denotes hydrogen or methyl, $S^{11}$ and $S^{12}$ independently of one another denote hydrogen, $C_1-C_4$-alkyl, cyclohexyl, benzyl, $C_1-C_4$-alkoxy, chlorine, $C_1-C_4$-dialkylamino, nitro, cyano, methoxy- or ethoxycarbonyl or methylsulphonyl, it being possible for $S^{11}$ or $S^{12}$ to be in the 5-, 6- and/or 7-position on the indolyl radical, or a radical $S^{11}$ or $S^{12}$ in the 7-position can form, together with $S^7$ or $S^8$, a bridge of the formulae $-CH_2CH_2-$,

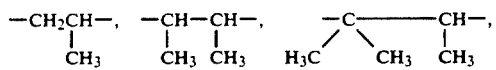

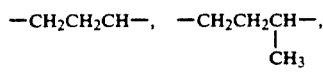

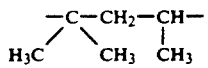

and $n^1$, $m^1$, $p^1$ and $q^1$ independently of one another denote 1 or 2 and $(An^1)^-$ denotes chloride, bromide, $BF_4^-$, $ClO_4^-$, $SiF_6^{2-}$ or the anions of $C_1-C_8$-carboxylic acids, $C_2-C_8$-dicarboxylic acids, $C_1-C_8$-alkanesulphonic acids, benzoic acid, benzenesulphonic acid or phthalic acid which are substituted by fluorine, chlorine, methyl, methoxy, hydroxyl, cyano or methoxycarbonyl.

Very particularly preferred pentamethine dyestuffs are those of the formula

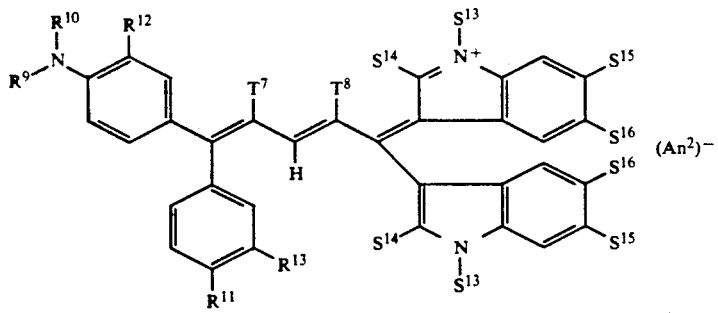

and derivatives of pentamethine dyestuffs of the formula

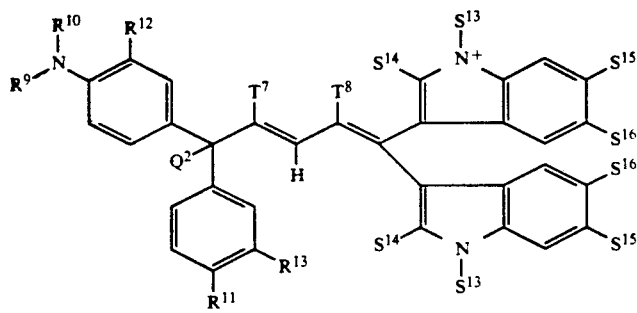

and their isomeric forms with reference to the position of the Q² group, as they are represented in the formulae III, IV or VII, VIII, in which

- $R^9$ and $R^{10}$ independently of one another denote hydrogen, methyl, ethyl, 1- or 2-propyl, 1- or 2-butyl, 2-methyl-1-propyl, cyclohexyl, allyl, benzyl, 4-tolyl, 4-anisyl, 4-ethoxyphenyl or 4-cyanophenyl, or
- $NR^9R^{10}$ denotes pyrrolidino, piperidino, morpholino or 3,5,5-trimethylpyrazolino,
- $R^{11}$ denotes hydrogen, chlorine, methyl, ethyl, methoxy, ethoxy, phenoxy or $NR^9R^{10}$,
- $R^{12}$ and $R^{13}$ independently of one another denote hydrogen, methyl, chlorine, methoxy or, together with $R^9$, denote a group of the formulae —CH₂—CH₂—, —CH₂—CH₂—CH₂—,

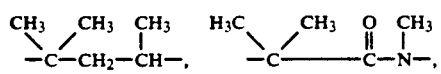

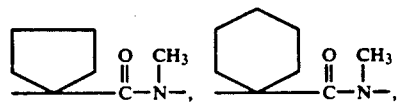

$Q^2$ denotes hydroxyl, methoxy, ethoxy, 1- or 2-propoxy, 1- or 2-butoxy, 2-methyl-1-propoxy, 1,1-dimethylethoxy, dimethylamino, diethylamino, dipropylamino, dibutylamino, propylamino, butylamino, pyrrolidino, piperidino, morpholino, piperazino, pyrazolo, imidazolo, triazolo, anilino, 4-methylanilino, 4-chloroanilino, 4-methoxyanilino, 4-nitroanilino, N-methylanilino, benzylamino, N-methylbenzylamino, N-ethylbenzylamino, benzoylamino, benzenesulphonylamino, phthalimido, naphthalimido, succinimido, maleimido, methylthio, ethylthio, phenylthio, methylsulphonyl, ethylsulphonyl, propylsulphonyl, butylsulphonyl, hexylsulphonyl, octylsulphonyl, benzenesulphonyl, 4-methylbenzenesulphonyl, 4-chlorobenzenesulphonyl, α-cyanobenzyl, α-cyano-4-methylbenzyl, α-cyano-4-chlorobenzyl, α-cyano-4-nitrobenzyl, α-cyano-α-picolyl, α-cyano-γ-picolyl, dicyanomethyl, cyanomethoxycarbonylmethyl, cyano-ethoxycarbonylmethyl, bis-methoxycarbonylmethyl, bis-ethoxycarbonylmethyl, 1-cyanoaceton-1-yl, 1-cyanobutanon-1-yl, 1-methoxycarbonylaceton-1-yl, 1-ethoxycarbonylaceton-1-yl, 1,3-pentanedion-3-yl, 1-benzoylaceton-1-yl, 2-cyano-1-phenylethanon-2-yl, 2-methoxycarbonyl-1-phenylethanon-2-yl, dibenzoylmethyl, cyano-phenylsulphonylmethyl, bisphenylsulphonylmethyl, 1,3-cyclopentanedion-2-yl, 1,3-cyclohexanedi-on-2-yl, 5,5-dimethyl-1,3-cyclohexanedion-2-yl, 1,3-indanedion-2-yl, 2,2-dimethylperhydro-1,3-dioxin-4,6-dion-5-yl, 3-methyl-1-phenyl-2-pyrazolin-5-on-4-yl, 1-(2-chlorophenyl)-3-methyl-2-pyrazolin-5-on-4-yl, 3-methyl-1-(4-methylphenyl)-2-pyrazolin-5-on-4-yl, 3-methyl-1-(4-nitrophenyl)-2-pyrazolin-5-on-4-yl, 3-methyl-1-phenyl-5-imino-2-pyrazolin-4-yl, 3-methyl-1-(3-sulfolanyl)-2-pyrazolin-5-on-4-yl, 3-ethoxycarbonyl-1-phenyl-2-pyrazolin-5-on-4-yl, 3-aminocarbonyl-1-phenyl-2-pyrazolin-5-on-4-yl, 4-hydroxy-1-methyl-2(1H)-quinolinon-3-yl, 3-cyano-4-methyl-6-hydroxy-2(1H)-pyridon-5-yl, 3-cyano-1,4-dimethyl-6-hydroxy-2(1H)-pyridon-5-ylor2,4,6-(1H,3H,5H)-pyrimidinetrion-5-yl, $S^{13}$ denotes methyl, ethyl, propyl, butyl, hexyl, octyl, 2-cyanoethyl, 2-methoxyethyl, 2-methoxycarbonylethyl, 2-chloroethyl, 2-acetoxyethyl, cyclohexyl, allyl or benzyl, $S^{14}$ denotes methyl, ethyl, propyl, butyl, hexyl, octyl, cyclohexyl, benzyl, phenyl, 2-, 3- or 4-chlorophenyl, 2-, 3- or 4-methoxyphenyl, 4-nitrophenyl, 2,4- dichlorophenyl, 2-, 3- or 4-tolyl or 2-, 3- or 4-pyridyl,

T⁷ and T⁸ independently of one another denote hydrogen or methyl,

S¹⁵ and S¹⁶ denote hydrogen, methyl, methoxy, chlorine, cyano, methoxycarbonyl or nitro and (An²)⁻ denotes chloride, bromide, formate, acetate, propionate, butyrate, hydroxyacetate, chloroacetate, oxalate, lactate, benzoate, salicylate, methanesulphonate, ethanesulphonate, trifluoromethanesulphonate, monofluorobutanesulphonate, benzenesulphonate, toluenesulphonate, chlorobenzenesulphonate, dodecylbenzenesulphonate, ClO₄⁻ or BF₄⁻.

The invention also relates to a process for the preparation of pentamethine dyestuffs and derivatives of pentamethine dyestuffs of the formulae I to IV.

The preparation is carried out by condensation of an aldehyde or ketone of the formula

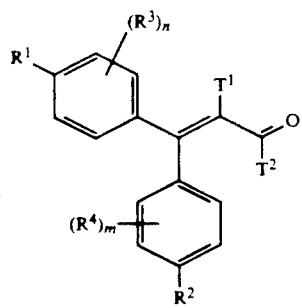

XI with an ethene of the formula

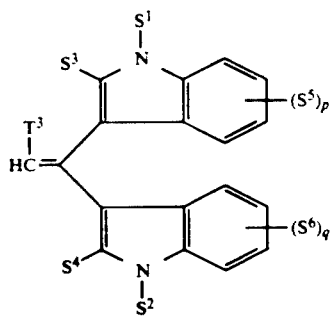

XIII or an ethene of the formula

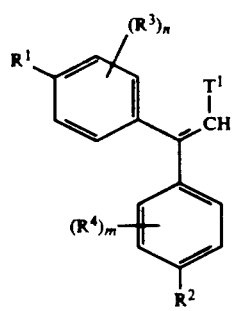

with an aldehyde or ketone of the formula

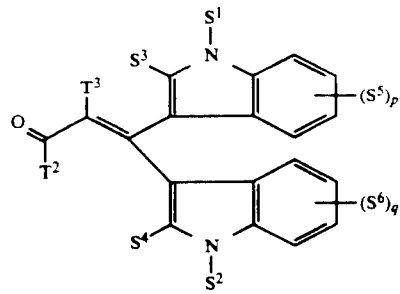

XIV and—in the case of the derivatives—subsequent reaction with a compound of the formula

HQ        XV, in which R¹-R⁴, T¹-T³, S¹-S⁶, Q, n, m, p, q and An⁻⁻ have the meaning given in the formulae I to IV.

The condensation is customarily carried out in solvents under acid and/or basic conditions, it being possible to add a water- or alcohol-abstracting agent, at temperatures between room temperature and the boiling point of the medium, preferably at 40°–140° C.

Suitable solvents are alcohols, such as methanol, ethanol, 1-propanol, 2-propanol, 1-butanol, 1-octanol, cyclohexanol and benzyl alcohol.

Other suitable solvents are esters, such as methyl acetate, ethyl acetate or butyl acetate; chlorinated hydrocarbons, such as methylene chloride, ethylene chloride, chloroform; ketones, such as acetone, 2-butanone; aromatics, such as benzene, toluene, xylene; chlorinated aromatics, such as chlorobenzene, dichlorobenzene; carboxylic acids such as formic acid, acetic acid, propionic acid; and anhydrides, such as acetic anhydride.

Suitable acids are inorganic acids, such as hydrochloric acid, sulphuric acid, tetrafluoroboric acid, perchloric acid, phosphoric acid; carboxylic acids, such as formic acid, acetic acid, trifluoroacetic acid; sulphonic acids, such as methanesulphonic acid, ethanesulphonic acid, trifluoromethanesulphonic acid, nonafluorobutanesulphonic acid, benzenesulphonic acid, toluenesulphonic acid; phosphonic acids, such as methanephosphonic acid; or ion exchangers, such as those based on sulphonated styrene/divinylbenzene polymers.

Suitable bases are amines, such as triethylamine, triethanolamine, piperidine, pyrrolidine or pyridine.

Suitable water- or alcohol-abstracting agents are anhydrides, such as acetic anhydride, trifluoroacetic anhydride, benzoic anhydride; acid chlorides, such as acetyl chloride, phosphorus oxychloride, thionylchloride, oxalyl chloride, phosgene; or inorganic oxides, such as phosphorus pentoxide.

The dyestuffs of the formula I obtained in this condensation can be isolated.

However, in order to prepare the derivatives of the formulae II to IV, they are advantageously reacted further without isolation with the compounds HQ of the formula XV. This is as a rule carried out in the condensation medium, it being possible to add one of the solvents described above. The temperatures are between room temperature and the boiling point of the medium, preferably between 20° and 140° C.

As a rule, a base is added thereto.

Suitable bases for the reaction with XV are amines, such as triethylamine, triethanolamine, piperidine, pyrrolidine or pyridine; hydroxides, such as lithium hydroxide, sodium hydroxide, potassium hydroxide, calcium hydroxide, tetrabutylammonium hydroxide; carbonates, such as lithium carbonate, sodium carbonate, potassium carbonate, calcium carbonate; or alkoxides, such as lithium methoxide, sodium methoxide, sodium ethoxide, sodium propoxide, potassium methoxide, potassium ethoxide, potassium tert.-butoxide; or ion exchangers, such as those based on aminomethylated styrenedivinylbenzene polymers.

Suitable bases are also those of the formula $$MQ \quad\quad XVI,$$

where
M represents lithium, sodium, potassium, ½ magnesium, ½ calcium, ½ barium, $N(C_2H_5)_4$,

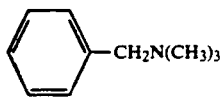

and
Q has the meaning given for the compounds of the formulae II to IV.

The invention additionally relates to mixtures of the compounds II to IV. The substituents $R^1$ to $R^4$, $S^1$ to $S^6$ and $T^1$ to $T^3$ can be identical to one another or different. The mixtures can be obtained by mixing the components. Preferred mixtures are those which are obtained directly in the synthesis process. They may contain a number of isomers, depending on the substituents of the starting components and their mixtures.

Such mixtures are as a rule distinguished by particularly good solubility in the solvents customary for the application.

The derivatives of the pentamethine dyestuffs of the formulae II to IV and their mixtures are colourless to brownish-coloured solids.

Solutions in acetic acid show a strong absorption with a maximum in the range 600–850 nm.

If a toluene solution, which is colourless to beige-coloured, is brought into contact with acid clay or silica gel, a blue to greenish-grey coloration is spontaneously developed. Additionally, a very strong absorption can be measured in the range from 600 to 850 nm, for example using the Dr. Lange Xenocolor LS 100 colour measurement system.

If a sample of a derivative of the formulae II to IV is ground with 2,2-bis-(4-hydroxy-phenyl)-propane, a colourless to beige-coloured powder is obtained. If this powder is heated, for example in a melting point tube, a strong very dark blue colour is developed from about 100° C.

The derivatives of the formulae II to IV are therefore outstandingly suitable according to the invention for pressure- or thermosensitive recording materials which are readable in the range 600–800 nm.

Recording materials which absorb in the near infrared are needed in order to be able to read the recorded information with suitable devices. The proliferation of computers and automatic data processing require devices which can read information from documents. Devices for optical character recognition (OCR) have therefore been developed which can read pages of text which are typed in the particular typeface programmed in. Such devices customarily work in the near infra-red and therefore the type to be read must naturally have absorptions in the near infra-red. However, customary pressure- and thermosensitive recording materials do not have such an absorption in the near infra-red.

Recording materials which have such an absorption in the near infra-red are described, for example, in U.S. Patent Specifications 4,020,056, 4,022,771, 4,026,883, 4,107,428 and 4,119,776 and in the European Application 0,124,377.

The derivatives of pentamethine dyestuffs of the formulae II to IV according to the invention and their mixtures are outstandingly suitable for such OCR-readable recording materials. They can be added in simple manner to existing colour-formation agent mixtures which develop, for example, blue or black shades in a known manner.

Suitable colour-formation agents, with which the derivatives of the formulae II to IV according to the invention can be mixed, derive, for example, from the phthalide, fluoran, spirodipyran, chromenoindole, phenoxazine, phenothiazine, carbazolylmethane, dihydroquinazolone, dihydro-3,1-benzoxazin-2-one or 3,1-benzoxazine substances classes or from other triarylmethane leuco dyestuffs.

The preparation of such pressure- or thermosensitive recording materials is carried out in a known manner.

A pressure-sensitive material consists, for example, of at least two sheets which contain at least one colour-formation agent of the formulae II to IV, dissolved or dispersed in a non-volatile organic solvent, and an acid developer.

Processes and preparations of this type are known, for example, from U.S. Patent Specifications 2,800,457, 2,800,458, 2,948,753, 3,096,189 and 3,193,404 and from German Offenlegungsschriften 2,555,080 and 2,700,937.

In order to prevent premature activation of the colour-formation agents present in the pressure-sensitive recording material, these are preferably sealed into microcapsules which can be broken, as a rule, by pressure.

Suitable capsule wall materials are, for example, gelatin/gum arabic, polyamides, polyurethanes, polyureas, polysulphonamides, polyesters, polycarbonates, polysulphonates, polyacrylates and phenol-, melamine- or urea-formaldehyde condensates, as are described, for example in M. Gutcho, Capsule Technology and Microencapsulation, Noyes Data Corporation 1972, G. Baster, Microencapsulation, Processes and Applications, publisher J. E. Vandegaar and German Offenlegungsschriften 2,237,545 and 2,119,933.

Preferably, microcapsules are used whose shells consist of polyaddition products of polyisocyanates and polyamines.

Isocyanates, amines, solvents and a suitable preparation process for such microcapsules are described, for example, in DE-OS (German Published Specification) 3,203,059.

Microcapsules are also preferably used whose shells consist of polyamides or melamine-formaldehyde condensates or gelatin/gum arabic.

Developers which may be mentioned are clays, acid-modified clays, oxides or acid salts and also monomeric or polymeric phenols or carboxylic acids.

Particularly preferred colour developers are salts of an aromatic carboxylic acid having at least 10 carbon atoms, of the formula

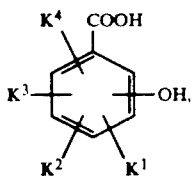

in which $K^1$, $K^2$, $K^3$ and $K^4$ denote hydrogen, halogen, hydroxyl, alkyl, cycloalkyl, aryl, aralkyl, alkoxy or aryloxy, or two adjacent radicals $K^1$, $K^2$, $K^3$ and $K^4$ may together form a ring, and in which these radicals may carry the abovementioned non-ionic substituents customary in dyestuff chemistry. Compounds of this type are described, for example, in DE-OS (German Published Specification) 3,635,311 and 3,635,742.

The derivatives of pentamethine dyestuffs of the formula II to IV are as a rule adequately to very highly soluble in the non-volatile organic solvents customary for microencapsulation.

Thermoreactive recording systems include, for example, heat-sensitive recording and copier materials and papers.

A material of this type is described, for example, in DE-OS (German Published Specification) 2,555,080.

Suitable developers are the same electron acceptors as are used in pressure-sensitive papers, preferably phenolic compounds, which are described, for example, in German Patent Specification 1,251,348, and also boric acid and organic, preferably aliphatic, dicarboxylic acids.

Another suitable thermoreactive developing system is described in DE-OS (German Published Specification) 3,337,296, in which acid-modified polymers, preferably of acrylonitrile, act as the developer.

The pentamethine dyestuffs of the formula I are suitable for optical recording materials.

Optical recording materials of this type carry a light-absorbing coating on a substrate, predominantly a plastic sheet. In addition to the dyestuff, this coating often also contains a binder The coating is advantageously applied as a solution, for example by spin coating. This coating must be very thin, very uniform and of high optical quality. Additionally, it must absorb strongly in the range of the light source. Lasers are used as light source, preferably laser diodes which work in the wavelength range 700 to 1,400 nm.

The preparation of coatings of this type and the use for optical recording is described, for example, in WO 84/02795 and EP 0,023,736.

The pentamethine dyestuffs of the formula I are particularly highly suitable for use in optical recording materials due to their pronounced absorption in the range 600 to 850 nm. Mixtures are also suitable. They are highly soluble in the solvents customary for coating.

Solvents of this type are, for example, chlorinated hydrocarbons, for example methylene chloride, 1,2-dichloroethane; ketones, for example 2-butanone, cyclohexanone; aromatics, for example xylene; esters, for example ethyl acetate or butyl acetate; alcohols, for example methanol, ethanol or butanol, or mixtures thereof. The alcohols are preferred, as they do not attack the plastic sheet.

Suitable binders are all film-forming materials, preferably polymers, for example polystyrene, poly-α-methylstyrene, poly(methyl methacrylate), polyvinyl chloride, polyvinyl acetate, polyvinyl/-vinylpyrrolidone, polycarbonate, cellulose nitrate, cellulose acetat butyrate or mixtures or copolymers thereof.

The pentamethine dyestuffs of the formula I are also suitable for the laser transfer printing process, as is described in Siemens Forsch.- und Entwickl.-Bericht (Siemens Research and Development Report) vol. 17 (1988) No. 6, p. 291.

EXAMPLE 1

8.82 g of the aldehyde of the formula

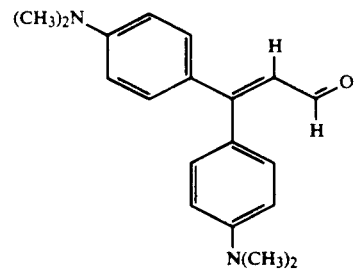

and 13.1 g of the ethene of the formula

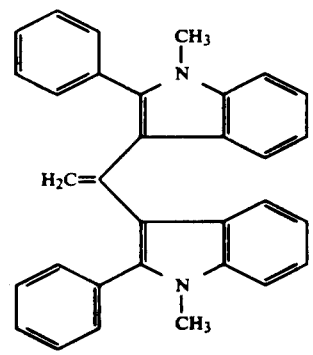

are stirred for 1 h at 80° C. in 50 ml of acetic anhydride with the addition of 3.0 g of methanesulphonic acid. After cooling, the blue solution, which contains the dyestuff of the formula

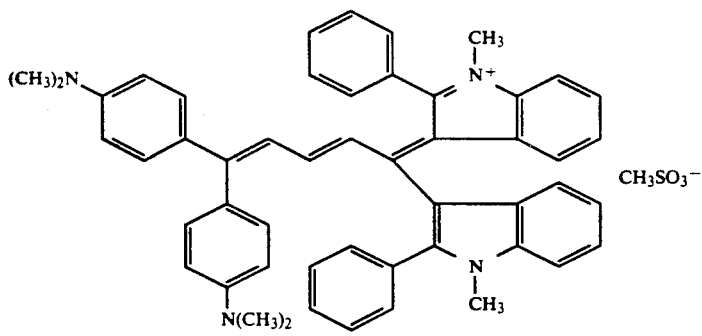

is poured into 300 ml of methanol. Adding 115 ml of 30% strength methanolic sodium methoxide solution dropwise and warming to 40° C. result in a suspension which is filtered off with suction, and washed with methanol and water and dried:

16.0 g (71% of theory) of beige crystalline powder of melting point 165°-170° C., which corresponds in one isomeric form to the formula

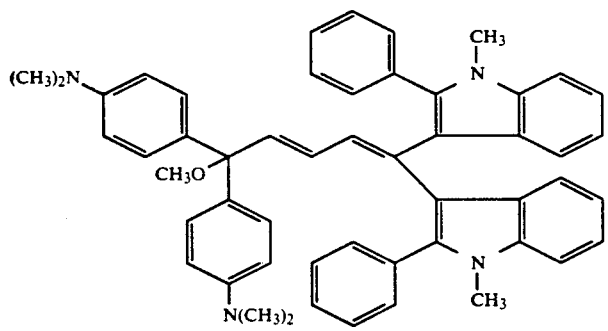

$\lambda_{max}$ in glacial acetic acid: 633 and 787 nm.
A dark blue shade is developed on acid clay.

EXAMPLE 2

4.66 g of the aldehyde of the formula

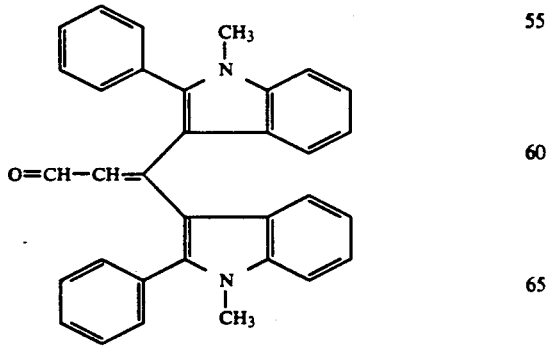

and 2.96 g of the ethene of the formula

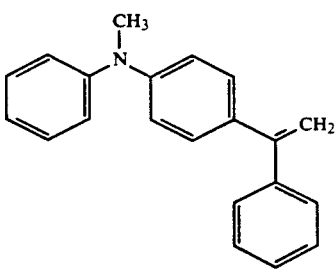

are stirred at 80°-90° C. for 45 min with 1.5 g of trifluoromethanesulphonic acid in 20 ml of acetic anhydride. After cooling, the blue solution, which contains the dyestuff of the formula

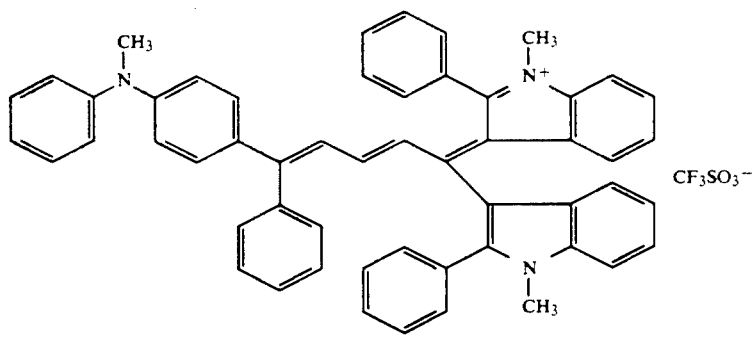

is discharged into 100 ml of methanol. Adding 45 ml of 30% strength methanolic sodium methoxide solution drop-wise produces a beige suspension which is filtered off with suction, and washed with methanol and water and dried:

5.8 g (74% of theory) of beige powder of melting point 122° C., which corresponds in one isomeric form to the formula

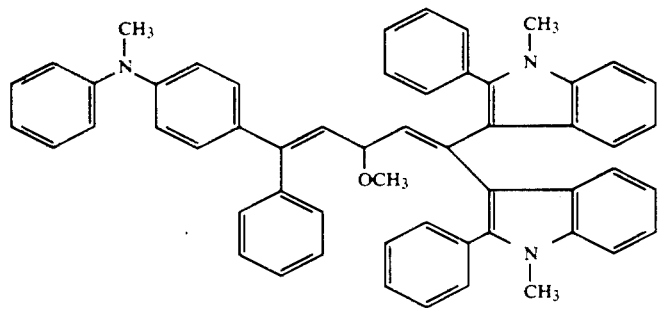

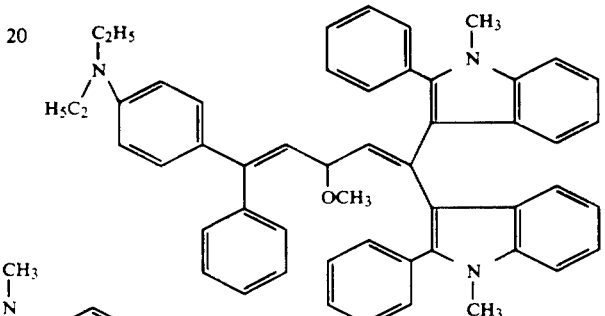

$\lambda_{max}$ in glacial acetic acid: 790 nm.
On acid clay: grey-blue.

EXAMPLE 3

Analogously to Example 2, using 2.51 g of the ethene of the formula

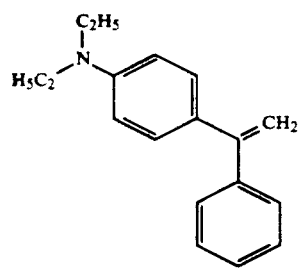

6.0 g (80% of theory) of beige powder are obtained which corresponds in one isomeric form to the formula Melting point: 125°–126° C.
$\lambda_{max}$ in glacial acetic acid: 805 nm.
On acid clay: grey-blue.

EXAMPLE 4

2.84 g of the aldehyde of the formula

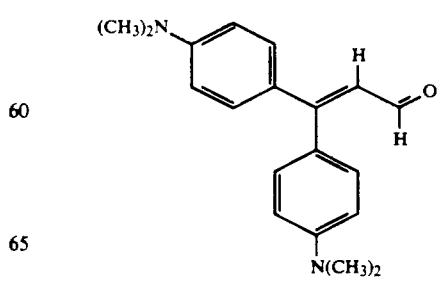

and 6.05 g of the propene of the formula of melting point 148° C., which corresponds in one isomeric form to the formula

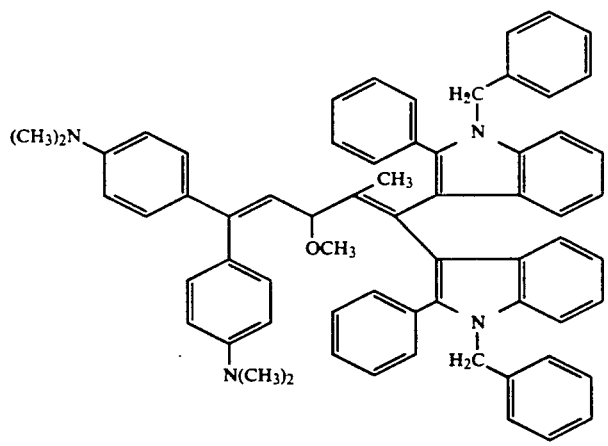

$\lambda_{max}$ in glacial acetic acid: 640, 789 nm.
On acid clay: blue.

EXAMPLE 5

Analogously to Example 4, using 5.2 g of the ethene of the formula

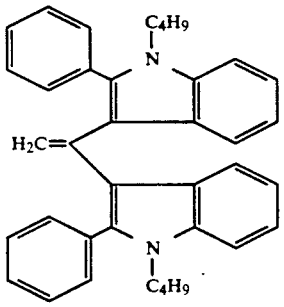

7.35 g (88% of theory) of beige powder are obtained,

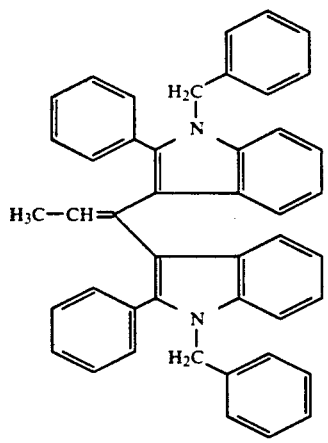

are stirred at 80°-90° C. for 45 min with 1 g of methanesulphonic acid in 20 ml of acetic anhydride. After cooling, the blue solution, which contains the dyestuff of the formula

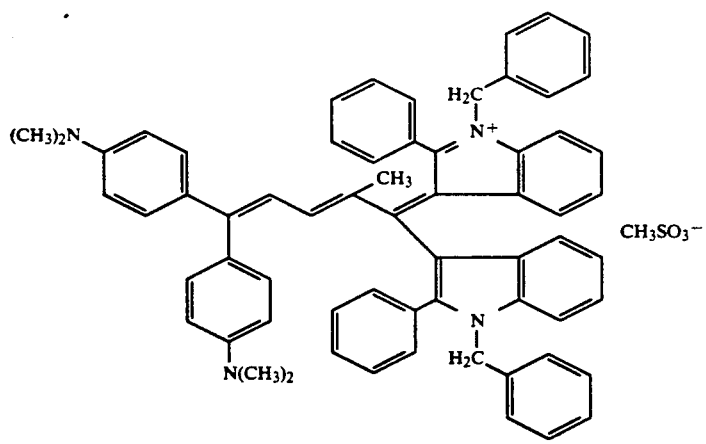

is discharged into 100 ml of methanol and converted into a greenish beige suspension by adding 45 ml of methanolic sodium methoxide solution. The precipitate is filtered off with suction, washed with methanol and water and dried: 6.0 g (66% of theory) of beige powder which corresponds in one isomeric form to the formula

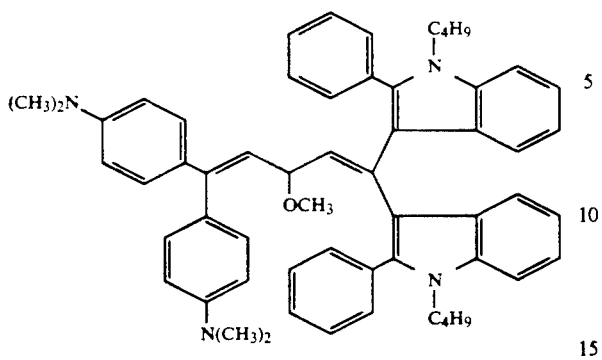

Melting point 158°–160° C.
$\lambda_{max}$ in glacial acetic acid: 638, 787 nm.
On acid clay: blue.

EXAMPLE 6

2.2 g of the ethene of Example 3 are dissolved by gentle warming in 20 ml of methanol with the addition of 0.3 g of methanesulphonic acid. 1.8 g of sodium p-toluenesulphinate are added. After stirring for 3 h, the precipitate is filtered off with suction, washed with methanol and water and dried: 2.0 g (78% of theory) of grey powder of melting point 203°–205° C., which corresponds in one isomeric form to the formula

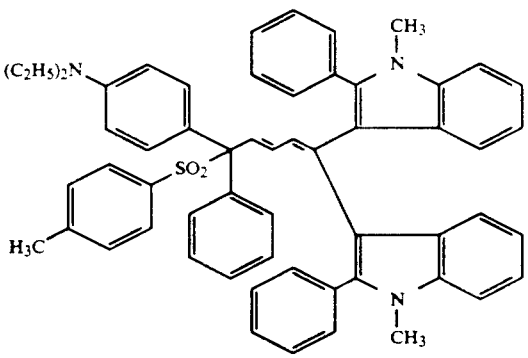

$\lambda_{max}$ in glacial acetic acid: 805 nm.
On acid clay: grey-blue.

EXAMPLE 7

3.3 g of the ethene of Example 5 are dissolved with 1 g of glacial acetic acid in 20 ml of methanol with warming. 3 g of acetylacetone and 8 g of anhydrous sodium carbonate are added. After stirring over night, the precipitate is filtered off with suction, washed with methanol and water and dried:

3.3 g (92% of theory) of pale green powder of melting point 115°–116° C., which corresponds in one isomeric form to the formula

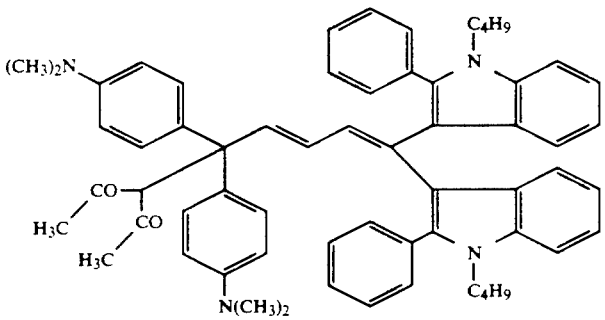

$\lambda_{max}$ in glacial acetic acid: 638, 787 nm.
On acid clay: blue

The following examples can be prepared analogously:

| Ex. | A | B | D/E | T¹ | T² | T³ | Q | λ_max (nm) |
|---|---|---|---|---|---|---|---|---|
| 8 | 4-(CH₃)₂N-C₆H₄- | 4-CH₃O-C₆H₄- | 1-ethyl-2-phenylindol-3-yl | H | H | H | OCH₃ | 530/800 |
| 9 | 4-(CH₃)₂N-C₆H₄- | 4-H₃C-C₆H₄- | 1-octyl-2-phenylindol-3-yl | H | H | H | OCH₃ | 804 |
| 10 | 4-[N(C₂H₅)(C₆H₅)]-C₆H₄- | C₆H₅- | 1-methyl-2-(4-methoxyphenyl)indol-3-yl | H | H | H | OC₂H₅ | 791 |
| 11 | 4-[((CH₃)₂CH)₂N]-C₆H₄- | 3,4-(CH₃O)₂-C₆H₃- | 1-methyl-2-(4-chlorophenyl)indol-3-yl | H | H | H | OH | 550/806 |
| 12 | 4-[N(C₂H₅)(CH₂C₆H₅)]-C₆H₄- | 4-[N(C₂H₅)(CH₂C₆H₅)]-C₆H₄- | 1-methyl-2-phenylindol-3-yl | H | H | H | OCH(CH₃)₂ | 638/790 |

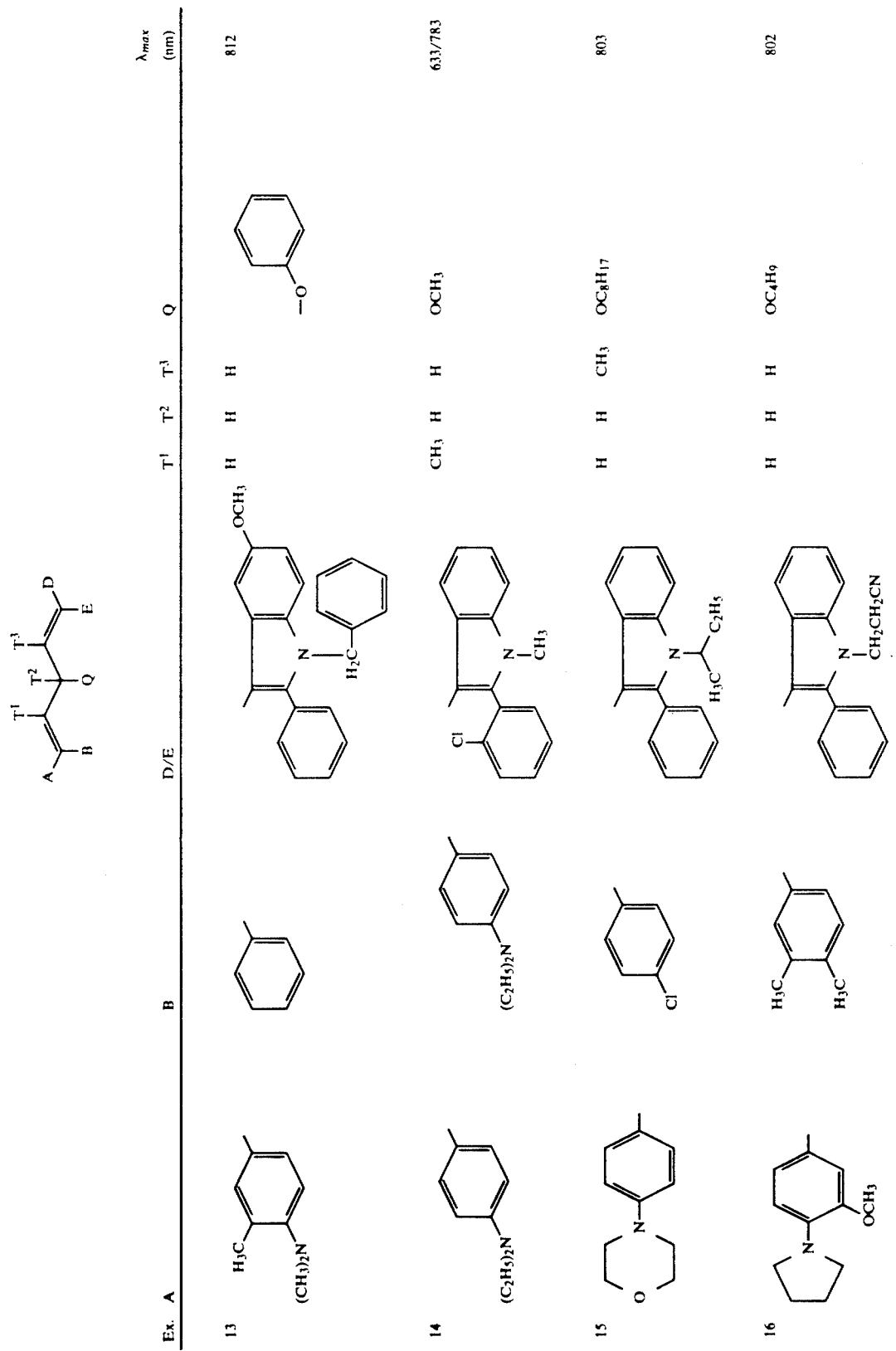

-continued
| Ex. | A | B | D/E | T¹ | T² | T¹ | Q | λ_max (nm) |
|---|---|---|---|---|---|---|---|---|
| 17 | 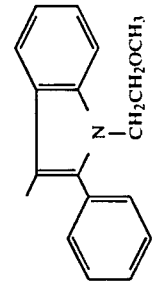 | Cl | 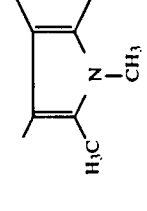N-CH₂CH₂OCH₃ | H | H | H | 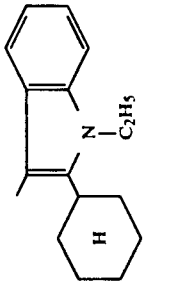 | 815 |
| 18 | (CH₃)₂N— | 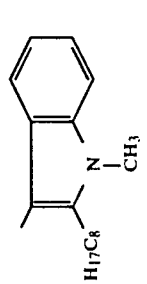(CH₃)₂N— | N-CH₃, H₃C— phenyl | H | H | Cl | OC(CH₃)₃ | 639/772 |
| 19 | 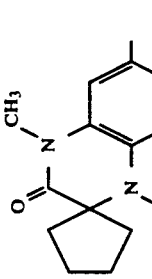(CH₃)₂N— | F— | N-C₂H₅, H₃C— cyclohexyl | H | H | CH₃ | OH | 770 |
| 20 |  | phenyl | N-CH₃, H₁₇C₈— | H | CH₃ | H | OCH₃ | 770 |

-continued
| Ex. | A | B | D/E | T¹ | T² | T³ | Q | $\lambda_{max}$ (nm) |
|---|---|---|---|---|---|---|---|---|
| 21 | 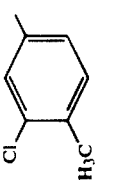 | 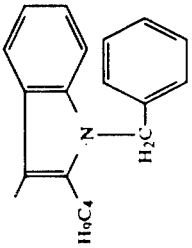 | 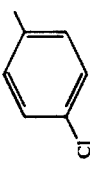 | H | H | H | −OCH(CH₃)(C₂H₅) | 770 |
| 22 | 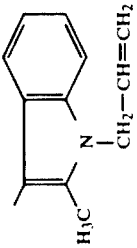 | 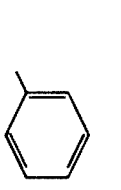 | 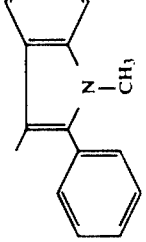 | H | H | H | OCH₃ | 768 |
| 23 | 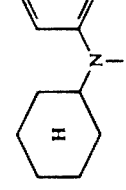 | | 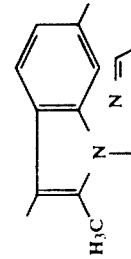 | H | H | H | OCH₃ | 810 |
| 24 | | | | H | H | H | OCH₃ | 645/771 |

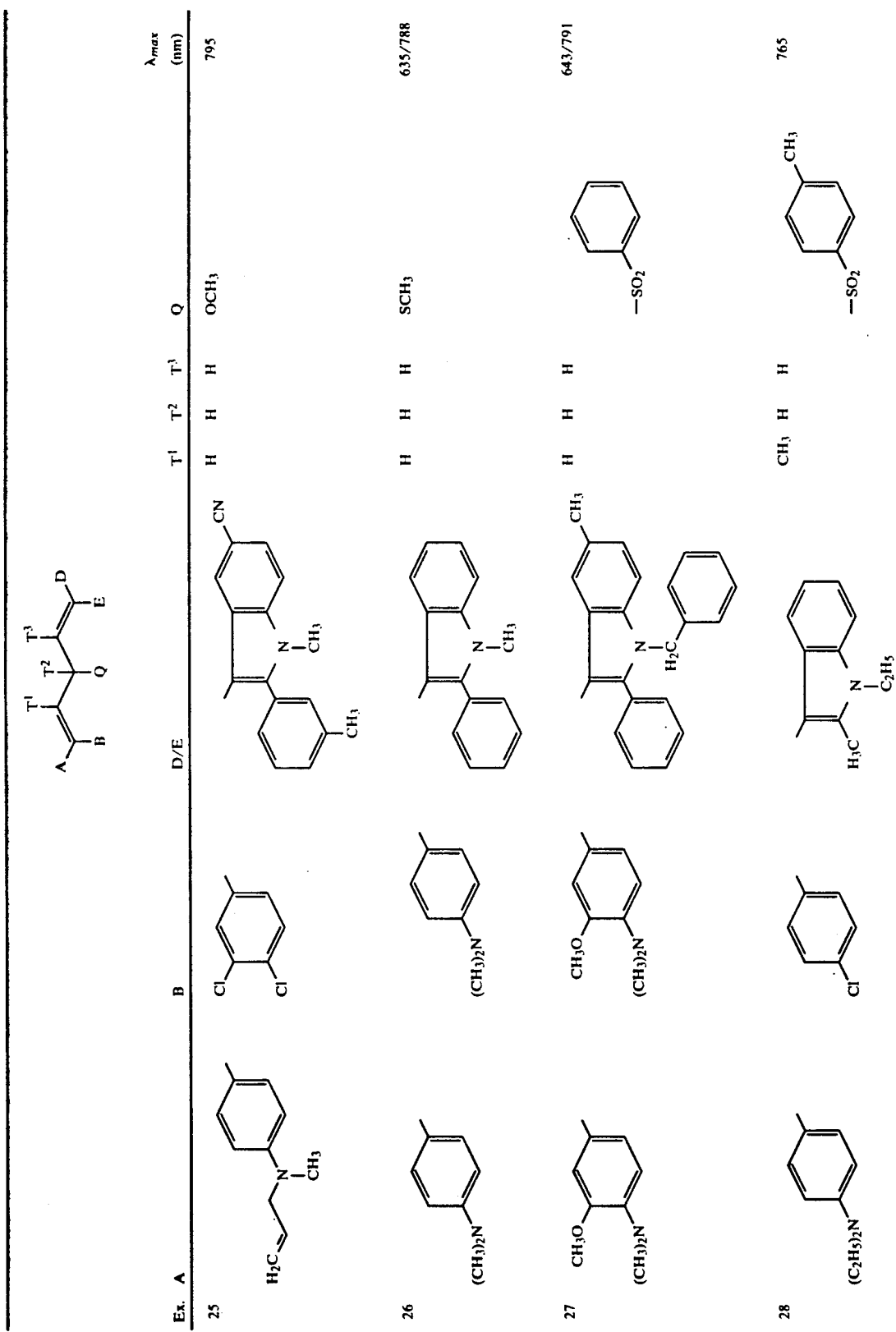

-continued

| Ex. | A | B | D/E | T¹ | T² | T³ | Q | λ_max (nm) |
|---|---|---|---|---|---|---|---|---|
| 29 | 4-methyl-N-methyl-N-(4-methylphenyl)aniline | 4-methylphenyl | 2-(N-cyclohexyl-N-H-amino)phenyl, methyl | H | H | H | 4-chlorophenylsulfonyl | 768 |
| 30 | N-ethyl-N-phenyl-4-methylaniline | 2-chlorophenyl | 2-(N-butyl)aminophenyl / phenyl | H | H | H | phenylamino | 790 |
| 31 | 4-(piperidin-1-yl)-methylphenyl | 4-(piperidin-1-yl)-methylphenyl | 2-(N-methyl)aminophenyl / 3-chlorophenyl | H | H | H | 4-chlorophenylamino | 640/789 |
| 32 | 4-(dimethylamino)-methylphenyl | 4-(dimethylamino)-methylphenyl | 2-(N-benzyl)aminophenyl / phenyl | H | H | H | 4-nitrobenzamido | 633/787 |

-continued
| Ex. | A | B | D/E | $T^1$ | $T^2$ | $T^3$ | Q | $\lambda_{max}$ (nm) |
|---|---|---|---|---|---|---|---|---|
| 33 | 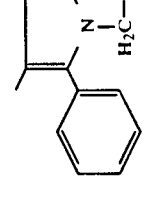 | 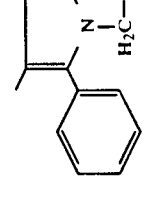 | 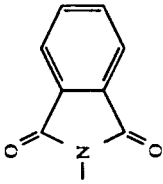 | H | H | Cl | 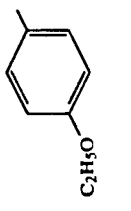 | 530/810 |
| 34 | 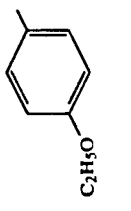 | 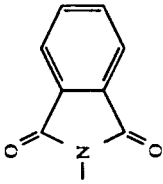 | 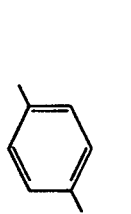 | H | H | H | 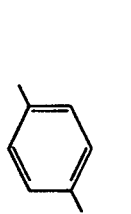 | 765 |
| 35 | 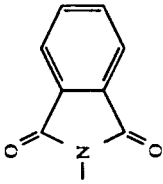 | 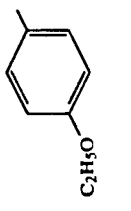 | 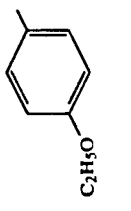 | H | H | H | 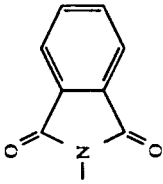 | 638/766 |
| 36 | (CH₃)₂N— | (CH₃)₂N— | | CH₃ | H | CH₃ | | 633/787 |

-continued

| Ex. | A | B | D/E | $T^1$ | $T^2$ | $T^3$ | Q | $\lambda_{max}$ (nm) |
|---|---|---|---|---|---|---|---|---|
| 37 | (CH₃)₂N–C₆H₄– | 4-Cl-C₆H₄– | 2-(N-CH₃)anilino styryl | H | —(CH₂)₃— | | morpholino | 802 |
| 38 | 3-CH₃-4-(N-CH₃-N-CH₂C₆H₅)amino-C₆H₃– | C₆H₅– | 4,5-dichloro-2-(N-C₄H₉)anilino styryl | H | H | H | CH(CN)₂ | 806 |
| 39 | (C₂H₅)₂N–C₆H₄– | 4-CH₃O-C₆H₄– | 2-(N-CH₃)anilino styryl | H | H | H | CH(COCH₃)₂ | 530/799 |
| 40 | (CH₃)₂N–C₆H₄– | 4-(CH₃)₂N-C₆H₄– | 2-(N-CH₂-pyridyl)anilino styryl | H | H | H | –CH(CN)(COOCH₃) | 633/786 |

-continued

| Ex. | A | B | D/E | T¹ | T² | T³ | Q | $\lambda_{max}$ (nm) |
|---|---|---|---|---|---|---|---|---|
| 41 | (julolidine-like tricyclic with N) | 4-CH₃-C₆H₄- | 2-(N-CH₃)aminophenyl, 4-Cl-phenyl vinyl | H | H | H | -CH(COCH₃)(CO-C₆H₅) | 804 |
| 42 | 2-(N-CH₃)amino-4-methylphenyl, CH(CH₃)- | C₆H₅- | 2-(N-CH₃)aminophenyl, pyridyl vinyl | H | H | H | 2-methyl-1,3-cyclohexanedione | 805 |
| 43 | 4-CH₃-C₆H₄-N(C₂H₄Cl)- | C₆H₅- | 2-(N-C₂H₅)aminophenyl, phenyl vinyl | H | H | H | -CH(COOC(CH₃)₃)₂ (dimethyl malonate-like) | 805 |
| 44 | 4-CH₃-C₆H₄-N(C₂H₅)₂ | 4-(C₂H₅)₂N-C₆H₄- | 2-(N-CH(CH₃)₂)aminophenyl, CH₃-C= phenyl vinyl | H | H | H | 2-methyl-1,3-indandione | 635/765 |
| 45 | 2-CH₃-4-N(CH₃)₂-phenyl (H₃C, (CH₃)₂N) | 3,5-dimethylphenyl | 2-(N-CH₃)aminophenyl, phenyl vinyl | H | H | H | -CH(CN)(4-NO₂-C₆H₄) | 807 |

-continued

| Ex. | A | B | D/E | $T^1$ | $T^2$ | $T^3$ | Q | $\lambda_{max}$ (nm) |
|---|---|---|---|---|---|---|---|---|
| 46 | (structure: methyl-substituted phenyl with N(CH₃) and NH groups, attached to C(O)C(CH₃)(CH₃)) | 4-chlorophenyl | indole-like structure with N–CH₃ and H₃C | H | H | CH₃ | phenyl-N=N-C(O)-CH(CH₃)-C(=)-CH₃ | 770 |
| 47 | 4-(CH₃)₂N-phenyl-N(CH₃)-(4-methylphenyl) | 4-(CH₃)₂N-phenyl | 4,5-dimethyl indole-like with N–C₂H₅ | H | H | H | phenyl-SO₂-CH(CN) | 632/790 |
| 48 | 4-methylphenyl-N(CH₃)-phenyl-N-(4-methylphenyl) | 4-(CH₃)₂N-phenyl-N(CH₃)-(4-methylphenyl) | indole-like with N–CH₂-phenyl and phenyl | H | H | H | 4-methylphenyl-N=N-C(O)-CH(CH₃)-C(=COOC₂H₅) | 640/790 |
| 49 | 4-(CH₃)₂N-(4-methylphenyl) | 4-(CH₃)₂N-phenyl | structure with N–CH₃, phenyl, CH₃O-phenyl | H | H | H | NH-C(=O)-C(CN)=C(CH₃)-CH(CH₃)-C(=O) | 633/788 |

-continued

| Ex. | A | B | D/E | T¹ | T² | T³ | Q | λ_max (nm) |
|---|---|---|---|---|---|---|---|---|
| 50 | 4-(CH₃)₂N-C₆H₄- | 4-phenoxyphenyl | N-benzyl-N-(2-ethylphenyl)-1-ethylpropenylamine | H | H | H | 2-acetamido-malonamide | 535/765 |

EXAMPLE 51

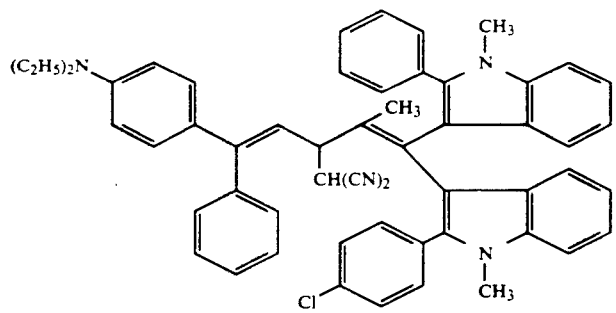

$\lambda_{max}$ -805 nm

EXAMPLE 52

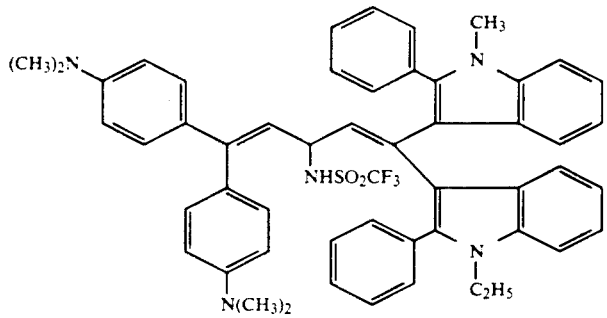

$\lambda_{max}$-633/789

EXAMPLE 53

2.3 g of the ether of Example 2 are dissolved in 15 ml of methanol with 0.6 g of p-toluenesulphonic acid. A stable blue solution of the dyestuff of the formula is obtained, which can be used for the preparation of an optical recording medium.

Stripping off the solvent gives 2.7 g of the dyestuff of the above formula Melting point: 128°-132° C.

EXAMPLE 54

3.3 g of the ether of Example 5 are dissolved in 10 ml of butanol with 0.4 g of methanesulphonic acid. A stable blue solution of the dyestuff of the formula

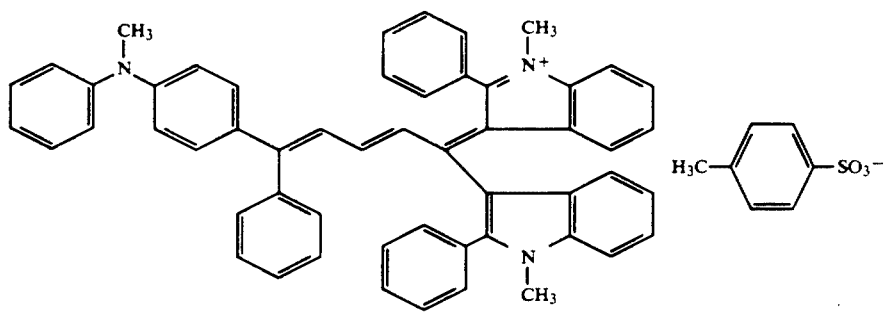

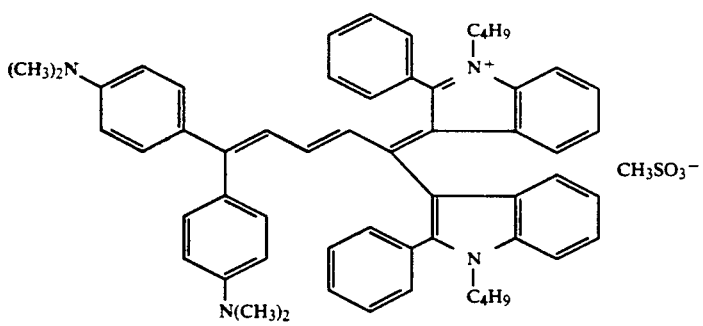

is obtained, which can be used for the preparation of an optical recording medium.

In an entirely analogous manner, the derivatives of Examples 1-52 can be converted into dyestuffs by using, for example, formic acid, acetic acid, propionic acid, butyric acid, hydroxyacetic acid, chloroacetic acid, oxalic acid, lactic acid, citric acid, benzoic acid, salicylic acid, methanesulphonic acid, ethanesulphonic acid, trifluoromethanesulphonic acid, nonofluorobutanesulphonic acid, benzenesulphonic acid, toluenesulphonic acid, chlorobenzenesulphonic acid, dodecylbenzenesulphonic acid, hydrochloric acid, hydrobromic acid, sulphuric acid, perchloric acid, tetrafluoroboric acid, hexafluorosilicic acid or hexafluorophosphoric acid, which do not yield, however, stable alcoholic solutions in all cases.

EXAMPLE 55

3 g of the pentamethine derivative of Example 2 are dissolved in a mixture of 40 g of dodecylbenzene and 60 g of chloroparaffin having a 45% Cl content (Marlican from Huls). 223 g of such a solution are mixed with 39.5 g of oxadiazinetrione of Desmodur H (NCO content: 20.5%). Mixing with 320 g of 0.5% strength polyvinyl alcohol solution and emulsification in the shear gradient of a rotor/stator emulsifier is then carried out. Crosslinking is carried out with 76 g of 9.0% strength diethylenetriamine solution. Post-treatment is carried out by warming the dispersion to 60° C. and stirring at 60° C. for three hours. A dispersion containing 40% capsules of capsule size 7.3 μm is obtained in this way.

250 ml of this dispersion are initially introduced and 40 g of fine cellulose powder (Arbocell BE 600/30 from Rettenmeier & Sohne) are slowly sprinkled in with intensive stirring. After intensive stirring for at least 30 minutes, 40 ml of 50% strength SBR latex (Baystal D 1600 from Bayer AG) are added. The resulting 48.5% strength brushing paint is diluted with water to a solids content of 30% and coated onto the back of a commercial base paper using an airbrush. The amount applied is 5 g/m² after drying.

The paper coated in this way is laid with the coated side on the side of a commercial carbon-free copying paper coated with the developer substance. On applying writing pressure to the paper coated with the capsules, a grey-blue copy, which has an intensive absorption in the near infra-red range of 650-850 nm, results on the copying paper.

The other derivative examples can also be used analogously.

EXAMPLE 56

A solution of 2 g of the pentamethinemethine derivative of Example 3 and 3 g of a benzoxazine of the formula

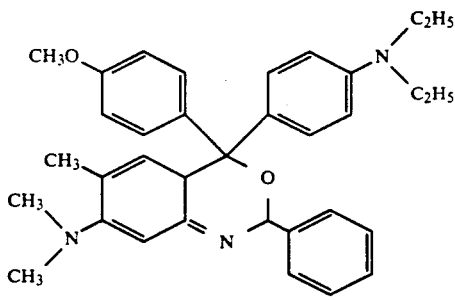

as is described in EP 187,329, in 80 g of diisopropylnaphthalene and 17 g of kerosene is microencapsulated in a known manner with gelatin and gum arabic by coacervation, mixed with starch solution and coated onto a sheet of paper. This sheet is laid with the coated side on the side of a commercial carbon-free copying paper coated with developer substance. On exerting a writing pressure on the paper coated with capsules, an intensive blue-black copy, which likewise has an intensive absorption in the near infra-red from 650 to 850 nm, results on the copying paper.

The other derivative examples can also be used analogously.

EXAMPLE 57

32 g of 4,4'-isopropylidene-diphenol (bisphenol A), 3.8 g of distearylamide of ethylenediamine, 89 g of kaolin, 20 g of a polyvinyl alcohol and 55 ml of water are ground in a ball mill until the particle size is about 5 μm. 6 g of the pentamethine derivative of Example 7, 3 g of a polyvinyl alcohol and 60 ml of water are ground to a particle size of about 3 μm in a 2nd ball mill. The two dispersions are added together and coated onto paper with a dry application weight of 5.5 g/m². By contacting the paper with a heated ball-point pen, a blue-grey recording is developed which shows an intensive absorption in the near infra-red of 650-850 nm.

The other derivative examples can also be used analogously.

EXAMPLE 58

A 5% strength solution of the pentamethine dyestuff of Example 54 in butanol/methanol 2/1, which contains 2.5% of a polymer based on polyvinyl acetate, is applied to a carrier sheet of poly(methyl methacrylate) by the spin coating process, a layer of 0.8 μm being formed. The sheet can be written on and read with the aid of a semiconductor laser.

The other dyestuff examples can also be used analogously.

I claim:

1. Pentamethine dyestuffs of the formula

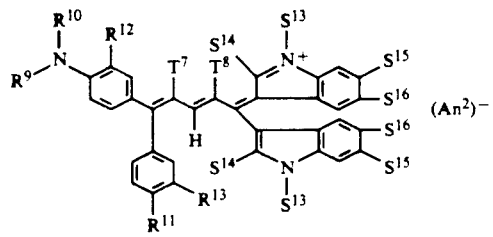

and derivatives of pentamethine dyestuffs of the formula

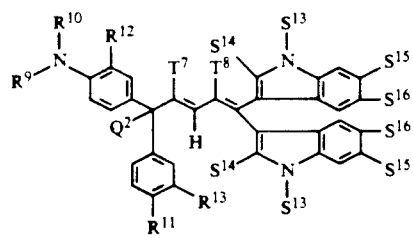

and their isomeric forms with reference to the position of the $Q^2$ group, as they are represented in claim 1, in which $R^9$ and $R^{10}$ independently of one another denote hydrogen, methyl, ethyl, 1- or 2-propyl, 1- or 2-butyl, 2-methyl-1-propyl, cyclohexyl, allyl, benzyl, phenyl, 4-tolyl, 4-anisyl, 4-cyanophenyl, or $NR^9R^{10}$ denotes pyrrolidino, piperidino, morpholino or 3,5,5-trimethylpyrazolino, $R^{11}$ denotes hydrogen, chlorine, methyl, ethyl, methoxy, ethoxy, phenoxy or $NR^9R^{10}$, $R^{12}$ and $R^{13}$ independently of one another denote hydrogen, methyl, chlorine, methoxy or, together with $R^9$, denote a group of the formulae —CH$_2$—CH$_2$—, —CH$_2$—CH$_2$—CH$_2$—,

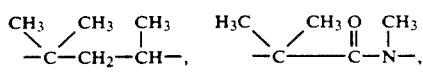

$Q^2$ denotes hydroxyl, methoxy, ethoxy, 1- or 2-propoxy, 1- or 2-butoxy, 2-methyl-1-propoxy, 1,1-dimethylethoxy, morpholino, imidazolo, triazolo, anilino, 4-methylanilino, 4-chloroanilino, phthalimido, succinimido, methylthio, ethylthio, benzenesulphonyl, 4-methylbenzenesulphonyl, a-cyano-4-nitrobenzyl, dicyanomethyl, cyanomethoxycarbonylmethyl, cyano-phenyl-sulphonylmethyl, 1,3-cyclohexanedion-2-yl, 1,3-indanedion-2-yl, 3-methyl-1-phenyl-2-pyrazolin-5-on-4-yl, 3-cyano-4-methyl-6-hydroxy-2(1H)-pyridon-5-yl, or 2,4,6-(1H,3H,5H)-pyrimidinetrion-5yl, $S^{13}$ denotes methyl, ethyl, propyl, butyl, hexyl, octyl, 2-cyanoethyl, 2-methoxyethyl, cyclohexyl, allyl or benzyl, $S^{14}$ denotes methyl, ethyl, propyl, butyl, hexyl, octyl, cyclohexyl, benzyl, phenyl, 2-,3- or 4-chlorophenyl, 2-, 3- or 4-methoxyphenyl, 2-, 3- or 4-tolyl or 2-, 3- or 4-pyridyl, $T^7$ and $T^8$ independently of one another denote hydrogen or methyl, $S^{15}$ and $S^{16}$ denote hydrogen, methyl, methoxy, chlorine, cyano, and $(AN^2)^-$ denotes methanesulphonate, ethanesulphonate, trifluoromethanesulphonate, monofluorobutanesulphonate, benzenesulphonate, toluenesulphonate.

2. Dyestuff of the formula

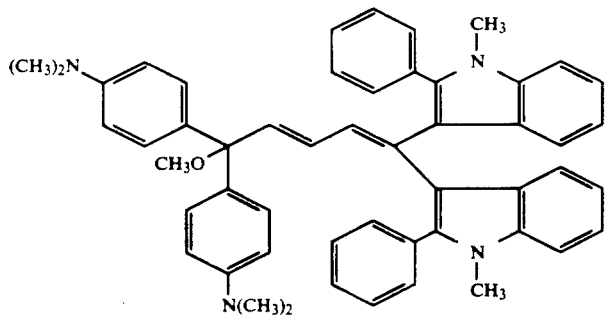

* * * * *